(12) United States Patent
Roßkamp et al.

(10) Patent No.: US 7,814,888 B2
(45) Date of Patent: Oct. 19, 2010

(54) METHOD FOR OPERATING AN INTERNAL COMBUSTION ENGINE

(75) Inventors: Heiko Roßkamp, Adelberg (DE); Georg Maier, Kernen (DE); Tim Gegg, Remseck (DE); Wolfgang Layher, Besigheim (DE); Arno Kinnen, Fellbach (DE); Christine Hallé, Ebersbach Fils (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 12/149,176

(22) Filed: Apr. 28, 2008

(65) Prior Publication Data

US 2008/0264388 A1    Oct. 30, 2008

(30) Foreign Application Priority Data

Apr. 30, 2007    (DE) .................. 10 2007 020 348

(51) Int. Cl.
 *F02M 51/00* (2006.01)
(52) U.S. Cl. .................. 123/472; 123/480; 123/486
(58) Field of Classification Search .................. 123/295, 123/299, 300, 301
 See application file for complete search history.

(56) References Cited

U.S. PATENT DOCUMENTS

| | | | | |
|---|---|---|---|---|
| 5,404,843 | A | * | 4/1995 | Kato .................. 123/73 B |
| 6,073,606 | A | * | 6/2000 | Shimizu et al. .............. 123/295 |
| 6,351,942 | B1 | * | 3/2002 | Nishimura et al. ............ 60/285 |
| 7,021,292 | B2 | * | 4/2006 | Yamaguchi et al. ......... 123/479 |
| 2008/0041144 | A1 | * | 2/2008 | Layher et al. ................. 73/115 |

* cited by examiner

*Primary Examiner*—Stephen K Cronin
*Assistant Examiner*—Keith Coleman
(74) *Attorney, Agent, or Firm*—Foley & Lardner LLP

(57) ABSTRACT

A method for operating an internal combustion engine having a fuel system which feeds fuel at a given pressure to a metering valve provides that a controller defines the opening time and the closing time of the metering valve and correspondingly actuates the metering valve so that the metering valve opens and closes at the defined times. In order to permit precise metering of fuel even in high-speed internal combustion engines there is provision for the controller to define at least one of the times for the opening or closing of the metering valve while taking into account the counterpressure actually prevailing at the outlet opening of the metering valve.

24 Claims, 5 Drawing Sheets

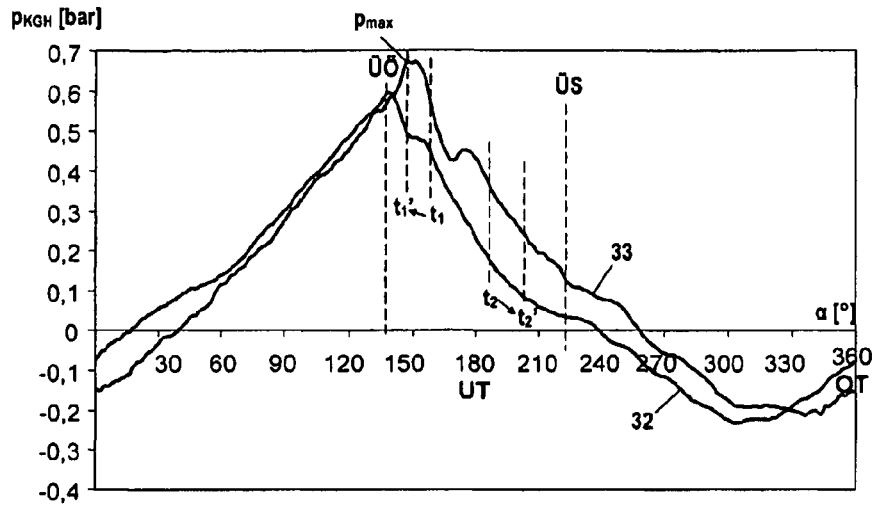
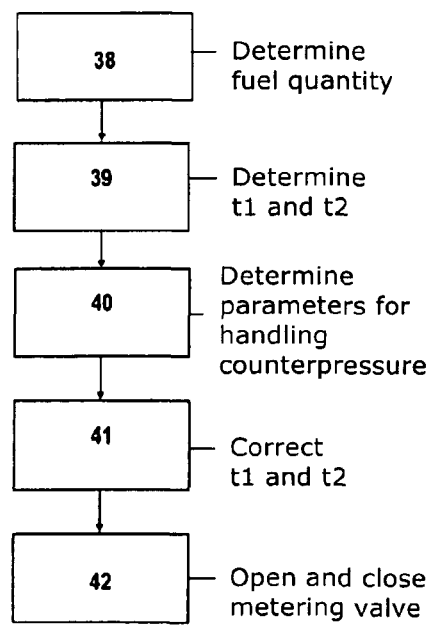
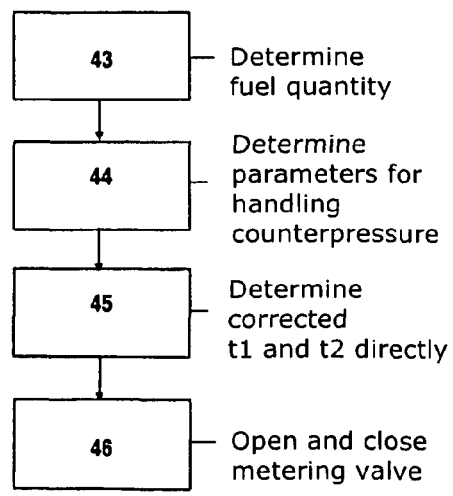

METHOD FOR OPERATING AN INTERNAL COMBUSTION ENGINE

CROSS-REFERENCE TO RELATED PATENT APPLICATIONS

The right of foreign priority is claimed under 35 U.S.C. §119(a) based on Federal Republic of Germany Application No. 10 2007 020 348.0, filed Apr. 30, 2007, the entire contents of which, including the specification, drawings, claims and abstract, are incorporated herein by reference.

BACKGROUND OF THE INVENTION

The invention relates to a method for operating an internal combustion engine.

It is known to feed fuel to an internal combustion engine via a fuel system with a fuel pump and a metering valve.

During operation, the pressure prevailing in the combustion chamber and crankcasing of the internal combustion engine fluctuates to a very high degree. The pressure fluctuates here both within a cycle as a function of the piston position and as a function of the rotational speed and the load. In metering valves which feed the fuel to the internal combustion engine at low overpressure, the fuel quantity which is fed to the internal combustion engine is influenced by the pressure in the internal combustion engine.

In order to reduce the influence of the fluctuating pressure on the fuel quantity which is fed to the internal combustion engine it is known to adjust the pressure of the fuel which is fed to the metering valve. As a result, the pressure difference between the fuel and the internal combustion engine remains constant.

In particular in the case of very high-speed engines such as are used, for example, in hand-held implements such as power saws, cut-off grinders or the like and which can reach rotational speeds of considerably more than 10 000 revolutions per minute, the pressure in the fuel system cannot be adjusted, or can only be adjusted at unacceptably high cost.

SUMMARY OF THE INVENTION

The invention is based on the object of specifying a method for operating an internal combustion engine which permits a desired fuel quantity to be fed to the internal combustion engine even in the case of high-speed engines.

This object is achieved by means of a method having the features of claim 1.

By virtue of the fact that the controller defines the opening time and/or the closing time of the metering valve while taking into account the actually prevailing counterpressure, the fuel quantity which is to be fed can easily be metered in a comparatively precise fashion. It is not necessary to make any changes to the fuel system. The fuel can be fed to the metering valve with a given, in particular, constant pressure. Adaptation of the fuel pressure to the crankcasing pressure is avoided. As a result, the fuel system can be of simple design. The given fuel pressure is obtained, for example, when the fuel is fed by a pump which is driven by the fluctuating crankcasing pressure. In the process, pressure fluctuations can arise, for example, by virtue of the fact that the internal combustion engine is operated at partial load over a long time period. When the internal combustion engine starts there is also insufficient underpressure available in the crankcasing to generate an overpressure of the fuel. However, the fuel pressure is advantageously essentially constant over all the operating states. This may be achieved, for example, by means of correspondingly configured pressure controllers and pressure accumulators. There is no provision for controlled adjustment of the fuel pressure.

The metering valve feeds the fuel, in particular, into a region of the internal combustion engine in which crankcasing pressure prevails. Crankcasing pressure prevails in the regions which are connected to the crankcasing, and in the case of a two-stroke engine therefore also in the overflow ducts. Slight pressure differences between, for example, the crankcasing and the overflow ducts can be ignored or compensated here. The fuel pressure corresponds here advantageously at most to the maximum crankcasing pressure. In particular, the fuel pressure is lower than the maximum crankcasing pressure. As a result, a pump which is driven by the fluctuating crankcasing pressure, in particular a diaphragm pump, can be used for feeding the fuel. For at least one operating state, and in particular for all the operating states, the fuel pressure advantageously corresponds here at most to the highest crankcasing pressure in this operating state. The maximum crankcasing pressure usually occurs here at full load. In other operating states, the highest crankcasing pressure of the respective operating state is below the maximum crankcasing pressure.

The metering valve advantageously feeds the fuel into an overflow duct of the internal combustion engine. The internal combustion engine is here in particular a two-stroke engine. The metering valve is advantageously fed fuel at a pressure which is ambient pressure or up to approximately 2 bar above the ambient pressure. The pressure is, in particular, approximately 0.3 bar to approximately 2 bar above the ambient pressure and advantageously approximately 0.5 bar to approximately 1.5 bar above the ambient pressure. It may be expedient for the fuel pressure to correspond to ambient pressure or up to approximately 0.5 bar above the ambient pressure, in particular approximately 0.05 bar to approximately 0.3 bar above the ambient pressure. The fuel pump for feeding fuel at such a small overpressure can be of simple design. The metering valve can also be of simple design. In a fuel system which feeds the fuel with a very small overpressure, it is advantageous to take into account the actually prevailing counterpressure at the metering valve for the sake of the precise metering of the fuel since, owing to the small pressure difference with respect to the pressure in the interior of the internal combustion engine, the fluctuations of the pressure in the internal combustion engine have a considerable influence on the fuel quantity which is fed. In contrast, in metering valves which feed fuel at very high pressure, in particular in injection valves, the counterpressure is negligibly small in many cases.

In order to introduce fuel well and at the same time achieve a small overpressure of the fuel, there is advantageously provision for the ratio of the absolute fuel pressure to the absolute crankcasing mean pressure to be approximately 1.3 to approximately 2.8, in particular approximately 1.7 to approximately 2.2. The crankcasing mean pressure is here the mean pressure over one entire revolution of the crankshaft. The fuel pressure and the crankcasing mean pressure are placed in a ratio as absolute pressures, that is to say not as relative pressures, compared to the ambient pressure. The fuel pressure is therefore approximately 1 to approximately 3 times the crankcasing mean pressure. Owing to the low fuel pressure, the fuel pump may be of simple design.

The introduction of the fuel into the overflow duct is advantageously to take place in such a way that charge stratification is made possible in the combustion chamber. For this purpose, the fuel is introduced into the overflow duct when the pressure in the overflow duct, and therefore also the pressure in the crankcasing, are relatively high. In this context the fuel is advantageously fed in while the overflow duct is opened to the combustion chamber.

It is also possible to provide for the metering valve to feed the fuel into the crankcasing. In this context, there is provision for the fuel to be fed directly into the interior of the crankcasking. The introduced fuel is conditioned in the crankcasing by the moving parts in the crankcasing. As a result, the fuel can be introduced into the crankcasing at very low pressure above ambient pressure. There is provision for the metering valve to be fed fuel at a pressure which is ambient pressure or up to approximately 0.5 bar, in particular approximately 0.05 bar to approximately 0.3 bar above the ambient pressure. This very small overpressure is sufficient to introduce fuel into the crankcasing. The ratio of the absolute fuel pressure to the absolute crankcasing mean pressure is advantageously to be approximately 0.0 to approximately 1.7, in particular approximately 0.9 to approximately 1.2 here. The fuel pressure advantageously remains constant for all the operating states, while the crankcasing mean pressure changes depending on the operating state.

In the course of a revolution of the crankshaft, the crankcasing pressure fluctuates to a very great extent and can in some cases be above the pressure in the fuel system. When the fuel is fed at a very small overpressure, there is therefore provision for fuel to be fed only at specific times. In the idling mode, only small fuel quantities have to be fed. In order to permit sufficiently precise metering there is provision for the fuel to be fed in the idling mode at a time at which a pressure which is between ambient pressure and approximately 0.3 bar underpressure, in particular between ambient pressure and approximately 0.1 bar underpressure compared to the ambient pressure prevails in the crankcasing. This usually occurs just after the bottom dead center of the piston. The crankcasing pressure is approximately constant in this region and is only slightly below the ambient pressure. The uniform, approximately constant pressure in the crankcasing brings about a constant pressure difference between the pressure in the fuel system and the crankcasing pressure. The time during which fuel is fed is therefore approximately proportional to the fuel quantity which is fed in this region. This easily permits precise metering of fuel. The pressure difference between the crankcasing pressure and the pressure in the fuel system is comparatively small. Therefore, a comparatively long time is required to supply even a small quantity of fuel. When fuel is fed via a metering valve, the valve reacts with certain chronological tolerances which, when the switching times of the valve are very short, result in comparatively large deviations of the quantity of fuel which is actually fed from the quantity of fuel which is supposed to be fed. This can be avoided by the comparatively long time period which is required to introduce fuel when there is a small underpressure in the crankcasing, so that precise metering of fuel can easily be achieved.

At full load, a large quantity of fuel has to be fed to the internal combustion engine. In order to be able to feed this fuel quantity, there is provision for the fuel to be fed at full load at a time at which the pressure in the crankcasing is below the fuel pressure. In this context, the crankcasing pressure should be as low as possible so that there is a large pressure difference with respect to the pressure in the fuel system. There is provision for the metering valve to open as early as possible if the crankcasing pressure has dropped below the pressure of the fuel. This makes it possible to avoid air from the intake duct passing into the fuel system. The metering valve is then closed at the latest when the crankcasing pressure has risen again to the value of the pressure in the fuel system.

The counterpressure prevailing at the outlet opening is expediently measured by a pressure sensor which is arranged in the outlet space. The outlet space comprises here all the regions which are fluidically connected to the outlet opening and in which therefore approximately the pressure prevailing at the outlet opening prevails. The outlet space is connected here to the outlet opening during the metering of fuel. It is possible to provide for the measured counterpressure to be taken into account directly. By means of the measured counterpressure, the controller adapts the opening time and/or closing time of the metering valve. It is also possible to provide for the counterpressure to be taken into account by taking into account the load. The load has a considerable influence on the pressure in the crankcasing so that it may be sufficient to take into account the load for the adaptation of the opening time and/or closing time of the metering valve. The crankcasing pressure is advantageously sensed as a load-dependent parameter. It may be advantageous firstly to sense the load by means of the crankcasing pressure and to take into account the load in the determination of the opening time and/or closing time of the metering valve, instead of using the crankcasing pressure directly as a counterpressure for the adaptation of the opening time and closing time. This is dependent on whether the relationships can be represented as simple algorithms or characteristic diagrams or whether, for example, complex calculations are necessary for directly taking into account the crankcasing pressure.

In particular the crankcasing pressure is sensed as a load-dependent parameter. However, it is also possible to provide for the position of a throttle element which is arranged in an intake duct of the internal combustion engine to be sensed as a load-dependent parameter. The intake duct feeds combustion air to the internal combustion engine. By means of the position of a throttle element which is arranged in the intake duct it is possible to draw conclusions about the load of the internal combustion engine. When the throttle element is opened completely, the engine runs at full load, whereas when the throttle element is partially or completely closed the partial load mode or idling mode occurs. The throttle element expediently has a throttle shaft which is connected in a rotationally fixed fashion to the throttle element, and the position of the throttle element is measured by a throttle shaft sensor which senses the rotational position of the throttle shaft. The load can easily be determined in this way.

It is also possible to provide for the pressure in an intake duct of the internal combustion engine to be sensed as a load-dependent parameter. The pressure is sensed here in particular downstream of a throttle element which is arranged in the intake duct. A load can also easily be determined in this way.

It is also possible to provide for the counterpressure to be taken into account by taking into account the rotational speed of the engine. The rotational speed of the internal combustion engine also has an influence on the pressure in the crankcasing and therefore on the counterpressure at the outlet opening of the metering valve. The rotational speed is advantageously determined by means of a generator which is arranged on the crankshaft. The generator can simultaneously be used to generate current for further electrical loads, in particular also to supply current to the controller. Both the load and the rotational speed are advantageously taken into account in the consideration of the counterpressure.

There is provision for the controller to define the opening time and the closing time as a function of the fuel quantity which is to be fed, and for the fuel quantity which is to be fed to be determined for each cycle of the internal combustion engine. Since the fuel quantity which is to be fed is determined precisely with respect to cycles, very good running behavior of the internal combustion engine is obtained. Rapid adaptation to changed conditions is possible so that the internal combustion engine reacts quickly.

The opening and closing times of the metering valve are advantageously determined as a function of the fuel quantity which is to be fed by means of a reference counterpressure, and at least one of the times, that is to say the opening time and/or the closing time, is corrected as a function of a parameter which takes into account the counterpressure at the outlet opening. Since the opening and closing times of the metering valve are first determined and subsequently corrected, both the determination and the correction of the times can take place comparatively easily and therefore very quickly. The correction advantageously takes place by means of a characteristic diagram here. However, it is also possible to provide for the correction to take place by means of a calculation. It is also possible to provide for the required fuel quantity and at least one parameter which takes into account the counterpressure at the outlet opening to be determined, and for the opening time and the closing time to be defined by reference to the fuel quantity and the parameter. In this case there is provision for the opening time and closing time for a reference counterpressure not to be defined but instead the opening time and closing time are defined directly on the basis of the fuel quantity and parameters. The opening time and closing time can therefore be defined more precisely than when previously defined times are corrected. The opening time and the closing time can be defined or calculated by reference to the fuel quantity and the parameter by means of a characteristic diagram.

An independent inventive idea relates to the fuel quantity to be fed to the internal combustion engine. Between 0.0006 g and 0.0015 g of fuel per kilowatt is advantageously fed to the internal combustion engine per stroke of the piston with respect to the power of the internal combustion engine at full load. There is provision that between 0.025 g and 0.06 g of fuel per cycle of the internal combustion engine and per liter of cubic capacity of the engine is fed to the internal combustion engine at full load. In particular, the fuel quantity which is fed per cycle to the internal combustion engine in the idling mode is approximately a third to a quarter of the fuel quantity which is fed per cycle to the internal combustion engine at the rated rotational speed. As a result, a stable running behavior of the internal combustion engine is achieved. At the same time, good exhaust gas values can be obtained.

Further objects, features and advantages of the present invention will become apparent from the detailed description of preferred embodiments that follows, when considered together with the accompanying figures of drawings.

BRIEF DESCRIPTION OF THE DRAWINGS

Exemplary embodiments of the invention will be explained below with reference to the drawing, in which:

FIG. 2 to FIG. 4 are diagrams of the pressure profile in the crankcasing of the internal combustion engine over one revolution of the crankshaft, FIG. 5 and FIG. 6 are schematic flowcharts for methods for operating an internal combustion engine.

DETAILED DESCRIPTION OF THE PREFERRED EMBODIMENTS

Figure 1:
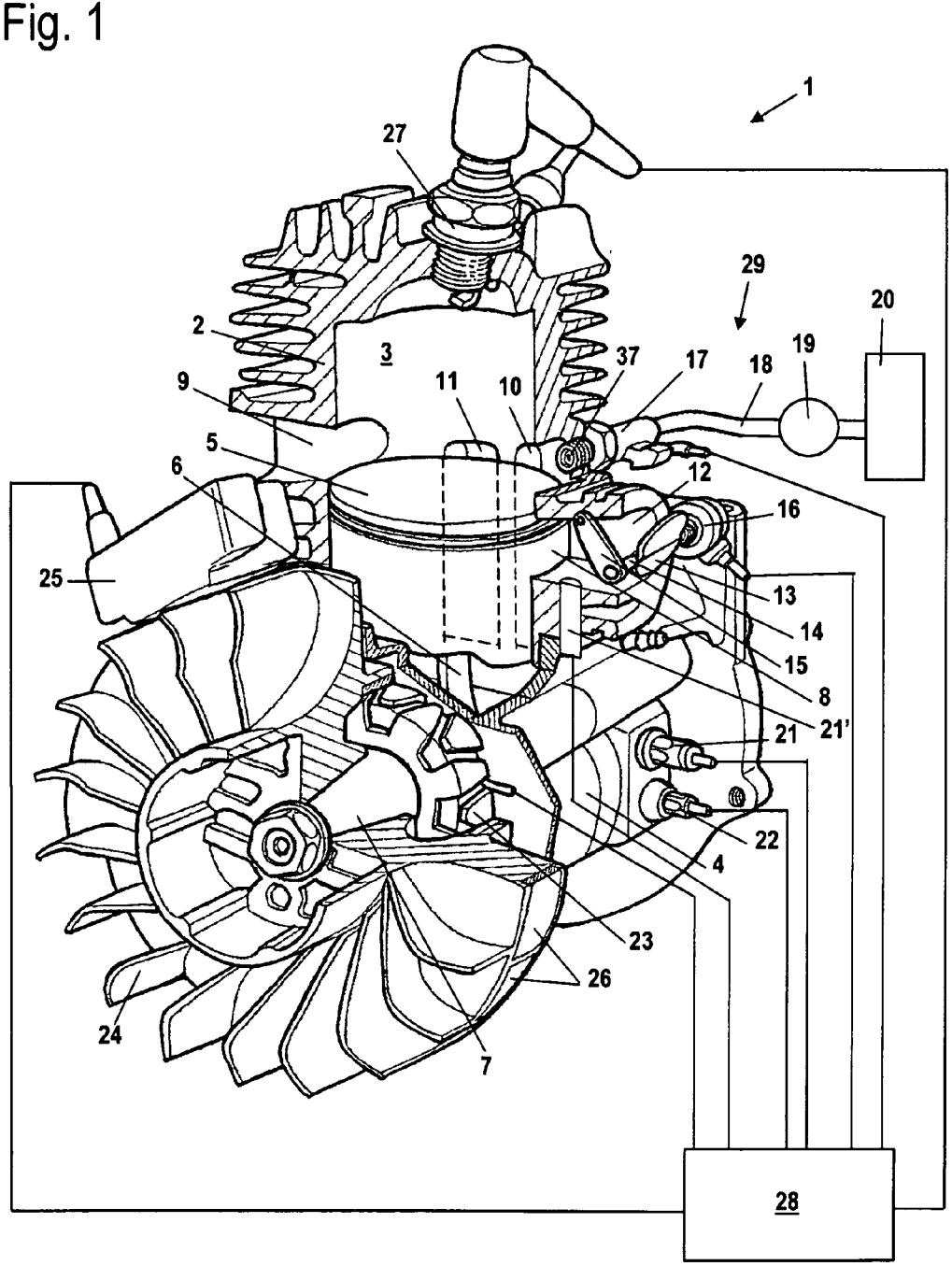
FIG. 1 is a schematic, partially sectional perspective view of an internal combustion engine.

The internal combustion engine 1 which is shown in FIG. 1 is embodied as a single-cylinder two-stroke engine and is used to drive a tool in a hand-held implement such as a motor saw, a cut-off grinder, a clearing saw or the like. The method according to the invention can also be applied in other engines. The internal combustion engine 1 has a cylinder 2 in which a combustion chamber 3 is formed. The combustion chamber 3 is bounded by a piston 5. The piston 5 is mounted so as to move to and fro in the cylinder 2 and drives, by means of a connecting rod 6, a crankshaft 7 which is rotatably mounted in a crankcasing 4. An intake duct 12, which is slot-controlled by the piston 5, leads into the crankcasing 4. A throttle valve 13 with a throttle shaft 14 is pivotably mounted in the intake duct 12. In order to activate the throttle valve 13, a throttle lever 15, on which an accelerator cable (not shown in FIG. 1) can act, is arranged in a rotatably fixed fashion on the throttle shaft 14. On the side lying opposite the throttle lever 15, a throttle shaft sensor 16, which may embodied, for example, as a potentiometer, is arranged on the throttle shaft 14. The throttle shaft sensor 16 determines the rotational position of the throttle shaft 14 and therefore the position of the throttle valve 13. The internal combustion engine 1 has a controller 28 to which the throttle shaft sensor 16 is connected. The intake duct 12 opens with an inlet 8 at the cylinder 2. An outlet 9, which is arranged approximately opposite the inlet 8 on the circumference of the cylinder 2, leads out of the combustion chamber 3.

In the region of the bottom dead center of the piston 5 (shown in FIG. 1), the crankcasing 4 is connected to the combustion chamber 3 via overflow ducts 11 which are near to the outlet and overflow ducts 10 which are near to the inlet. Two overflow ducts 10 which are near to the inlet and two overflow ducts 11 which are near to the outlet are provided, one of each of which ducts is provided in FIG. 1. The overflow ducts 10, 11 which are not shown are arranged in front of the sectional plane dividing the outlet 9 in FIG. 1.

In order to feed fuel, the internal combustion engine 1 has a fuel system 29 which comprises a fuel tank 20, a fuel pump 19, a fuel line 18 and a metering valve 17. The fuel pump 19 feeds fuel from the fuel tank 20 via the fuel line 18 to the metering valve 17. The fuel pump 19 feeds the fuel at a constant pressure to the metering valve 17. In order to ensure a constant pressure at the metering valve, a pressure-limiting valve may be arranged in the fuel line 18. The metering valve 17 is arranged on an overflow duct 10 which is near to the inlet, and said metering valve 17 opens with an outlet opening 37 into the overflow duct 10 which is near to the inlet. The metering valve 17 is connected to the controller 28. The controller 28 controls the opening and closing of the outlet opening 37 of the metering valve 17. The metering valve 17 may be, in particular, a solenoid valve.

A pressure sensor 21 and a temperature sensor 22 are arranged on the crankcasing 4. The pressure sensor 21 measures the pressure $p_{KGH}$ and the temperature in the crankcasing 4. The pressure sensor 21 and the temperature sensor 22 are also connected to the controller 28.

In addition to the pressure sensor 21, or as an alternative thereto, a pressure sensor 21' is provided which measures the pressure $p_A$ in the intake duct 12 downstream of the throttle valve 13. The pressure sensor 21' is also connected to the controller 28.

Outside of the crankcasing 4, a generator 23, which generates power on the basis of the rotation of the crankshaft 7, is arranged on the crankshaft 7. At the same time, the generator 23 supplies a signal from which the rotational speed n and the position of the crankshaft 7 can be determined. An impeller wheel 24 which is arranged on the crankshaft 7 engages over the generator 23. Arranged on the circumference of the impeller wheel 24 are pole shoes 26 which direct the magnetic field of a permanent magnet, arranged on the impeller wheel 24, to the circumference of the impeller wheel. Arranged on the circumference of the impeller wheel 24 is an ignition module 25 in which, when the impeller wheel 24 rotates, a voltage is induced owing to the magnet. This voltage supplies the ignition voltage. A spark plug 27 projects into the combustion chamber 3 of the internal combustion engine 1. The ignition module 25 can be connected directly to the spark plug 27. However, it is also possible to provide for the ignition module 25 and the spark plug 27 to be connected to the controller 28. The voltage supply of the spark plug 27 can also be provided via the generator 23. The generator 23 is connected to the controller 28 which evaluates the generator signal and determines the rotational speed n of the internal combustion engine 1 and the position of the crankshaft 7. In this context, the position of the crankshaft 7 can be determined once or repeatedly per revolution of the crankshaft 7.

During the operation of the internal combustion engine 1, combustion air is sucked into the crankcasing 4 through the inlet 8 via the intake duct 12 in the upward stroke of the piston 5. During the upward stroke of the piston 5, the combustion air is compressed in the crankcasing 4. As soon as the upward-moving piston 5 opens the overflow ducts 10 and 11 to the combustion chamber 3, the combustion air flows over out of the crankcasing 4 and into the combustion chamber 3. The metering valve 17 feeds fuel to the combustion air. The fuel/air mixture which is produced is compressed in the combustion chamber 3 of the upward-moving piston 5 and is ignited in the region of the top dead center by the spark plug 27. The combustion accelerates the piston 5 upward with respect to the crankcasing 4. As soon as the outlet 9 opens, exhaust gases escape from the combustion chamber 3. As soon as the overflow ducts 10 and 11 open to the combustion chamber 3, the remaining exhaust gases present in the combustion chamber 3 are scavenged from the combustion air which continues to flow into the combustion chamber 3 via the overflow ducts 10, 11.

Figure 3:
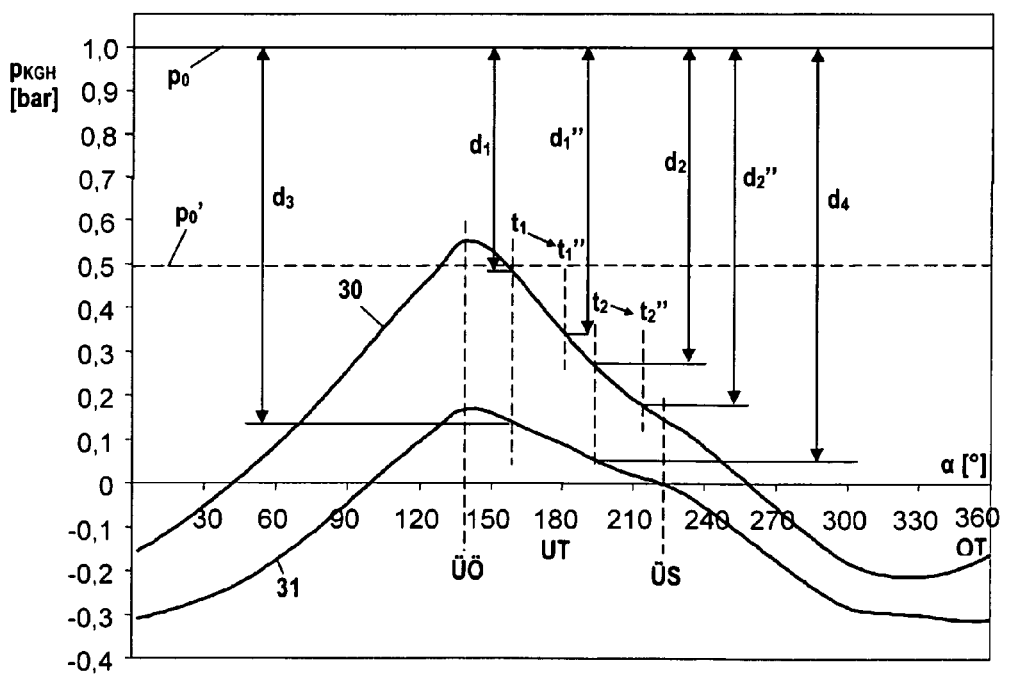

The fuel pump 19 feeds fuel at a constant pressure $p_0$ to the metering valve 17. Depending on the design of the fuel feed device, different fuel pressures $p_0$ can also be set for different operating states. The fuel pressure is advantageously kept largely constant by means of corresponding closed-loop and open-loop control devices. Subsequent adjustment of the fuel pressure $p_0$ as a function of the pressure prevailing at the outlet opening 37 is not provided. The pressure $p_0$ is advantageously ambient pressure or up to approximately 2 bar above the ambient pressure. In particular, the pressure is approximately 0.3 bar to approximately 2 bar and advantageously approximately 0.5 bar to approximately 1.5 bar above the ambient pressure. A pressure $p_0$ of approximately 1 bar above the ambient pressure is considered particularly advantageous. However, a fuel pressure $p_0'$ which corresponds at maximum to the maximum crankcasing pressure $p_{max}$ and which is in particular lower than the maximum crankcasing pressure $p_{max}$ can also be provided. This is shown in FIG. 3. Owing to the movement of the piston 5 and owing to different load states, a highly fluctuating pressure prevails at the outlet opening 37 of the metering valve 17. The pressure at the outlet opening 37 corresponds to the pressure in the crankcasing 4 since the overflow duct 10 is connected to the crankcasing 4. The pressure at the outlet opening 37 corresponds to the pressure which prevails in the outlet space which is connected to the outlet opening 37, and in the exemplary embodiment therefore in the overflow ducts 10 and 11 and in the crankcasing 4. The outlet space is in particular the space which is connected to the outlet opening 37 during the metering of fuel.

Figure 2:
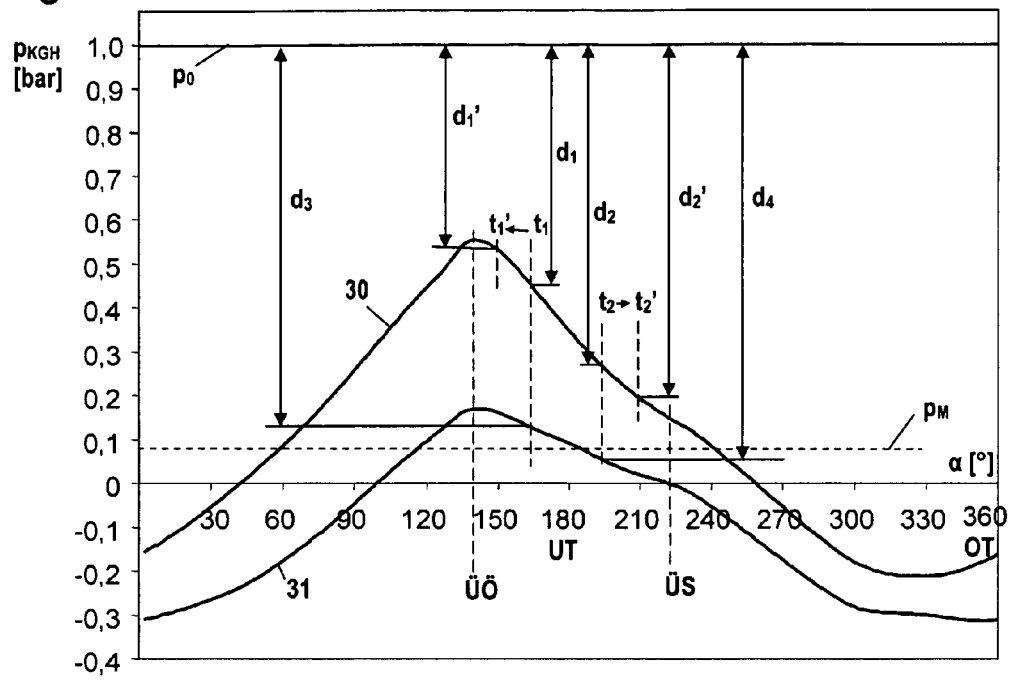

In FIG. 2, the crankcasing pressure $p_{KGH}$ over one revolution of the crankshaft 7 is given as a pressure above the ambient pressure. The position of the crankshaft 7 is given here as a crankshaft angle α. The curve 30 characterizes the relative pressure in the crankcasing 4 compared to the ambient pressure at full load, and the curve 31 characterizes the relative pressure at low partial load. As FIG. 2 shows, the crankcasing pressure $p_{KGH}$ fluctuates very greatly over one revolution of the crankshaft 7 and can be higher or lower than the ambient pressure. The crankshaft angle α of 180° characterizes the bottom dead center UT of the piston 5 and a crankshaft angle α of 360° or 0° characterizes the top dead center OT of the piston 5. The time ÜÖ characterizes the opening of the overflow ducts 10 and 11, into the combustion chamber 3, and the time ÜS characterizes the closing of the overflow ducts 10, 11 by the piston 5. The pressure $p_0$ characterizes the pressure of the fuel which flows over out of the outlet opening 37 into the overflow duct 10. The pressure $p_0$ is constant and in the exemplary embodiment it is 1 bar. Furthermore, in FIG. 2 the crankcasing mean pressure $p_M$, that is to say the mean pressure in the crankcasing 4, is given over one cycle of the internal combustion engine 1 by way of example for the pressure profile at full load (shown in the curve 30). The fuel pressure $p_0$ is selected here in such a way that the fuel pressure $p_0$ which is given as the absolute pressure is approximately 1.3 to approximately 2.8, in particular approximately 1.7 to approximately 2.2, based on the crankcasing mean pressure $p_M$ which is given as the absolute pressure. The fuel pressure $p_0$ is advantageously constant here over all the operating states, while the crankcasing mean pressure $p_M$ changes depending on the operating state. The resulting ratio of the absolute fuel pressure to the absolute crankcasing mean pressure should be in the given value range for all the operating states. The fuel pressure $p_0'$ advantageously corresponds at most to approximately the maximum crankcasing pressure $p_{max}$ shown in FIG. 4. The maximum crankcasing pressure $p_{max}$ occurs here at the time ÜÖ when the overflow ducts 10, 11 open. The maximum crankcasing pressure $p_{max}$ characterizes in particular the highest pressure which occurs in the crankcasing 4 over all the operating states of the internal combustion engine 1.

During operation, the controller 28 of the internal combustion engine 1 determines the fuel quantity to be fed for each cycle of the internal combustion engine 1. The term cycle refers here to one revolution of the crankshaft 7 in a two-stroke engine. In a four-stroke engine, one cycle comprises two revolutions of the crankshaft. The fuel to be fed can be determined by the controller 28 as a function, for example, of the load L, the temperature and/or the rotational speed n of the internal combustion engine 1. By reference to the fuel quantity to be fed, the controller 28 specifies the opening time $t_1$ and the closing time $t_2$ for the metering valve 17 and actuates the metering valve 17 in such a way that the metering valve 17 opens and closes at the defined times $t_1$, $t_2$. At the same time, one of the times $t_1$, $t_2$ can be defined, and the other time $t_1$, $t_2$ can be defined by the controller 28 as a function of the fuel quantity to be fed. Both times $t_1$, $t_2$ can also be defined in a variable fashion by the controller 28.

At a low partial load there is provision for the metering valve 17 to open at the time $t_1$ and close at the time $t_2$ in order to feed a fuel quantity determined by the controller 28. The pressure difference between the fuel pressure $P_0$ and the crankcasing pressure $p_{KGH}$ at the times $t_1$ and $t_2$ is relatively large. At the time $t_1$ there is a pressure difference $d_3$ with respect to the fuel pressure $p_0$, and a pressure difference $d_4$ at the time $t_2$. The pressure differences $d_3$ and $d_4$ are approximately of equal magnitude in the exemplary embodiment. Although the crankcasing pressure $p_{KGH}$ changes between the times $t_1$ and $t_2$, the change is only comparatively small.

At full load, the crankcasing pressure $p_{KGH}$ is, as the curve 30 shows, considerably higher at the times $t_1$ and $t_2$. The difference in pressure $d_1$ between the fuel pressure $p_0$ and the crankcasing pressure $p_{KGH}$ is considerably smaller at the time $t_1$ in the case of full load than the difference in pressure $d_3$ in the case of a low partial load. The pressure difference $d_2$ at the time $t_2$ between the fuel pressure $p_0$ and the crankcasing pressure $p_{KGH}$ is also smaller than the pressure difference $d_4$ in the case of a low partial load. The relatively small pressure difference means that, given the same opening time $t_1$ and the same closing time $t_2$ for the metering valve 17, a smaller quantity of fuel is fed in the case of full load than in the case of partial load. In order to compensate for this, the opening period of the metering valve 17 can be extended. This can be achieved by virtue of the fact that the closing time $t_2$ is moved to a later closing time $t_2'$, or the opening time $t_1$ is moved to an earlier opening time $t_1'$. It is also possible to move both the opening time $t_1$ and the closing time $t_2$. By changing the opening time of the metering valve 17 it is possible to adapt the opening period to the counterpressure at the outlet opening 37 of the metering valve 17.

As is shown by FIG. 2, at the time $t_1'$ there prevails a pressure difference $d_1'$ with respect to the fuel pressure $p_0$ which is smaller than the pressure difference $d_1$ at the time $t_1$. The pressure difference $d_2'$ at the time $t_2'$ is greater than the pressure difference $d_2$ at the time $t_2$. These changed pressure differences $d_1'$, $d_2'$ must also be taken into account in the adaptation of the opening time $t_1$ and of the closing time $t_2$ of the metering valve 17. In order to be able to take into account the different pressure level in the crankcasing, and therefore the counterpressure at the outlet opening 37, it is possible, for example, to store the closing time $t_2$ in a characteristic diagram as a function of the opening time $t_1$ and as a function of the engine load. A correction factor for the closing time $t_2$ can also be specified in the characteristic diagram, with which correction factor a closing time which has been determined for a reference counterpressure can be corrected.

As FIG. 2 shows, when fuel is fed into the overflow duct 10, the metering valve 17 can be opened only at times which are after the opening of the overflow duct 10 and before the closing of the overflow duct 10. The times $t_1$, $t_2$, $t_1'$ and $t_2'$ are between the times ÜÖ and ÜS. Accordingly, fuel is fed into the overflow duct 10 only if the overflow duct 10 is opened to the combustion chamber 3 and combustion air flows over out of the crankcasing 4 into the combustion chamber 3. During this time, the pressure in the overflow duct 10 is comparatively high. This comparatively high counterpressure at the metering valve 17 brings about good charge stratification between the combustion air in the overflow duct 10 which contains fuel and the combustion air in the crankcasing 4 which contains only very small quantities of fuel or no fuel. Therefore, before the metering valve 17 opens, largely fuel-free air flows out of the crankcasing 4 and into the combustion chamber 3. This fuel-free air divides the fuel, which subsequently flows mixed with combustion air, from the exhaust gases from the preceding cycle which are arranged in the combustion chamber 3. As a result, low exhaust gas values of the internal combustion engine can be achieved.

In the diagrams in FIG. 3, the crankcasing pressure $p_{KGH}$ is also specified for full load with the curve 30, and for low partial load with the curve 31. The opening period of the metering valve 17 does not necessarily have to be changed in order to perform adaptation to the counterpressure which prevails at the outlet opening 37 of the metering valve 17. As is shown by FIG. 3, it is also possible to move the opening time $t_1$ to a later opening time $t_1''$, and the closing time $t_2$ to a later time $t_2''$, in order to achieve adaptation to the counterpressure. The difference in pressure $d_1''$ prevailing at the time $t_1''$ compared to the fuel pressure $p_0$ is greater than the difference in pressure $d_1$ at the time $t_1$. Likewise, the difference in pressure $d_2''$ at the time $t_2''$ is greater than the difference in pressure $d_2$ at the time $t_2$. The difference in pressure between the fuel pressure $p_0$ and crankcasing pressure $p_{KGH}$ is increased by moving the opening time $t_1$ and closing time $t_2$ to a later time. As a result, the fuel quantity which is fed to the internal combustion engine 1 is increased without the opening period of the metering valve 17 having been changed. As FIG. 3 shows, the difference in pressures $d_1''$, $d_2''$ in the exemplary embodiment are still smaller than the difference in pressures $d_3$, $d_4$ at the times $t_1$ and $t_2$ in the case of a low partial load, which is shown by means of the curve 31. As a result of the moving of the opening time $t_1$ and closing time $t_2$ it is not possible to achieve complete compensation of the counterpressure at the metering valve 17 in the exemplary embodiment. It may therefore be additionally necessary to provide for the opening time to be extended.

In FIG. 4, the crankcasing pressure $p_{KGH}$ is also plotted against the crankshaft angle $\alpha$. The curve 32 shows the pressure profile in the crankcasing 4 at a first, low rotational speed, and the curve 33 shows the pressure profile at a second, high rotational speed. As FIG. 4 shows, the pressure at high rotational speeds between the opening and closing of the overflow ducts is higher than the pressure at low rotational speeds, with the exception of a short time period after the opening of the overflow ducts. The rotational speed accordingly also influences the counterpressure at the outlet opening 37 of the metering valve 17. Both curves 32, 33 show the pressure profile for the same load, specifically for full load. In order to feed the internal combustion engine 1 a fuel quantity which is defined by the controller 28, it is necessary for the metering valve 17 to be opened at the time $t_1$ and closed at the time $t_2$ at the first, low rotational speed (curve 32). In the case of a second, high rotational speed (curve 33), the difference in pressure at the times $t_1$ and $t_2$ with respect to the pressure $p_0$ of the fuel (FIGS. 2 and 3) is smaller so that, given the same opening and closing times, a relatively small quantity of fuel is fed. In order to feed the same fuel quantity at a low rotational speed, the opening time $t_1$ can be moved to a relatively early opening time $t_1'$, and the closing time $t_2$ can be moved to a relatively late closing time $t_2'$. It is also possible to provide for the opening time $t_1$ or the closing time $t_2$ to be moved. For the sake of adaptation it is also possible to provide for both the opening time $t_1$ and the closing time $t_2$ to be moved to a later time and at the same time to leave the opening period of the metering valve 17 unchanged, as is described in FIG. 3 for adaptation to different loads.

FIGS. 5 and 6 are schematic diagrams of methods for taking into account the counterpressure at the outlet opening 37 of the metering valve 17. The method according to FIG. 5 provides for the fuel quantity which is to be fed to be determined in the method step 38. In the method step 39, the opening time $t_1$ and the closing time $t_2$ for the metering valve 17 are determined for a reference counterpressure for the fuel quantity to be fed. In the method step 40, one or more parameters for taking into account the counterpressure at the outlet opening 37 are determined. The parameters may be, for example, the pressure in the crankcasing, the load of the internal combustion engine or the rotational speed of the internal combustion engine. In this context the load may be taken into account by means of the pressure $p_{KGH}$ in the crankcasing, by means of the position of a throttle element arranged in the intake duct or by means of the pressure $p_A$ in the intake duct. The pressure $p_{KGH}$ is measured by the pressure sensor 21, the pressure $p_A$ is measured by the pressure sensor 21', and the position of the throttle valve 13 is measured by the throttle shaft sensor 16. The counterpressure is advantageously taken into account by means of a plurality of parameters, for example by means of the load and the rotational speed, so that comparatively precise metering of the fuel can be achieved. It is also possible, however, to provide for the counterpressure to be compensated only partially, and for only one of the parameters, in particular the rotational speed, to be taken into account.

In the method step 41, the opening time $t_1$ and/or the closing time $t_2$ are corrected as a function of the parameters with which the counterpressure is taken into account. In this context it is possible to correct one of the times, but it is also possible to provide for both times to be corrected. The correction can be carried out, in particular, by means of a characteristic diagram or by means of a calculation. The correction advantageously takes into account the pressure profile of the counterpressure as a function of the crankshaft angle. In the method step 42, the metering valve 17 is opened or closed by the controller 28 at the defined times.

The method which is outlined in FIG. 6 also provides for the fuel quantity which is to be fed in a cycle to be determined in method step 43. The determination is also carried out here as in the method from FIG. 5. In the method step 44, parameters for taking into account the counterpressure are determined. This method step corresponds to the method step 40 from FIG. 5. In the method step 45, the opening and the closing times for the metering valve 17 are determined directly by reference to the fuel quantity to be fed and by reference to the parameter or parameters for taking into account the counterpressure. The determination can be carried out here by means of one or more characteristic diagrams or by means of a calculation. In the method step 46, the metering valve 17 is opened and closed at the determined times $t_1$, $t_2$.

Figure 7:
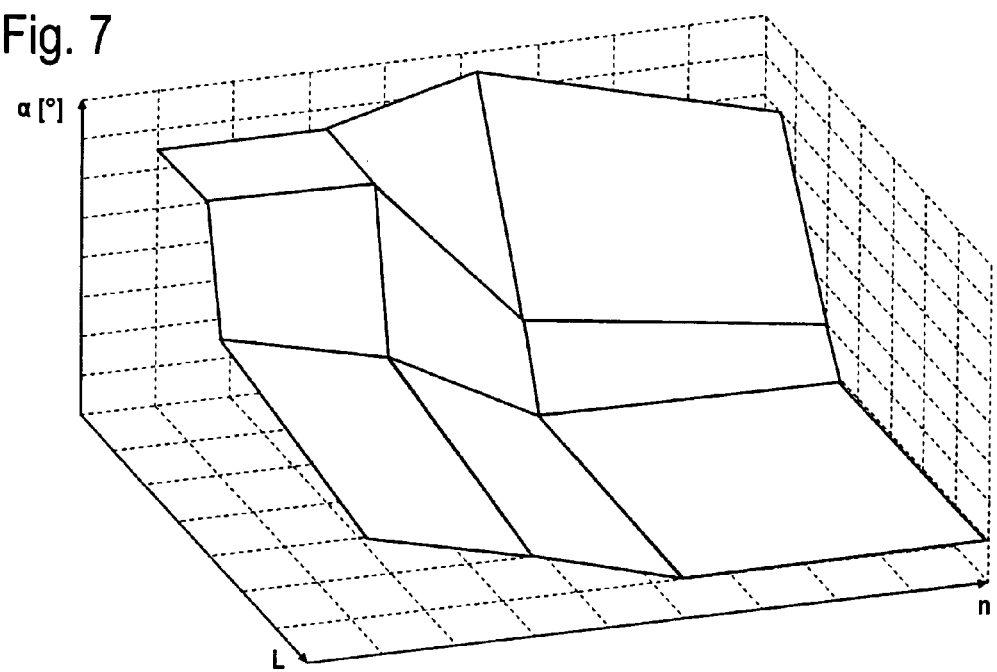
FIG. 7 is as schematic illustration of a characteristic diagram for the determination of the opening time of a valve as a function of the load and rotational speed.

FIG. 7 is a schematic characteristic diagram for determining the opening time $t_1$ for the metering valve 17. In the exemplary embodiment shown, the closing time $t_2$ is kept constant. The opening time $t_1$ is specified as a crankshaft angle α. The opening time $t_1$ occurs chronologically before the top dead center of the piston 5. A relatively large crankshaft angle α therefore characterizes a late opening time $t_1$, that is to say a relatively short opening period of the metering valve 17 at the same closing time $t_2$. In the characteristic diagram, the opening time $t_1$ is illustrated schematically as a function of the load L and the rotational speed n. In this context, each combination of load L and rotational speed n is assigned an opening time $t_1$ so that an opening time $t_1$ can be determined from the characteristic diagram for each combination of load L and rotational speed n.

Figure 8:
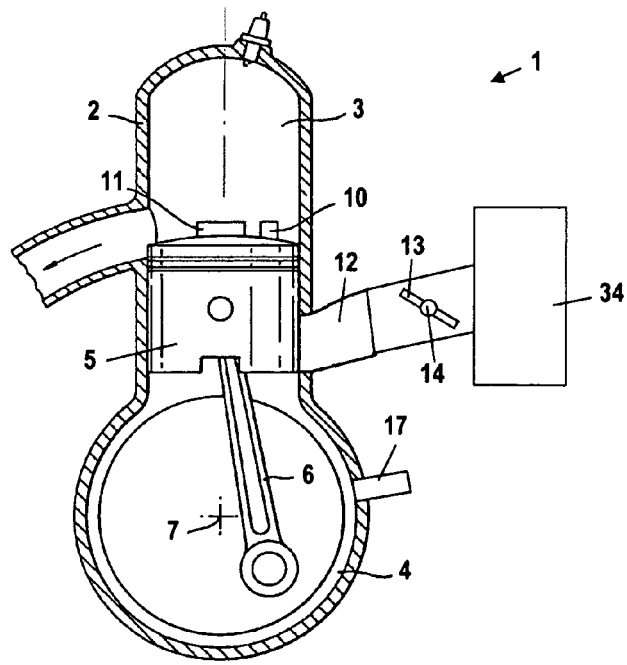
FIG. 8 is a schematic illustration of an exemplary embodiment of an internal combustion engine.

FIG. 8 is a schematic diagram of an exemplary embodiment of an internal combustion engine 1 whose design corresponds essentially to the internal combustion engine 1 shown in FIG. 1. In this context, for the sake of simplicity, FIG. 8 does not show all the components of the internal combustion engine 1, such as sensors, controller and the like. The internal combustion engine 1 which is shown in FIG. 8 differs from the internal combustion engine 1 which is shown in FIG. 1 in that the metering valve 17 is not arranged on an overflow duct 10, 11 but rather on the crankcasing 4. The metering valve 17 accordingly feeds fuel directly into the interior of the crankcasing. As is shown by FIG. 8, the intake duct 12 is connected to an air filter 34 via which ambient air is sucked into the crankcasing 4.

Figure 9:
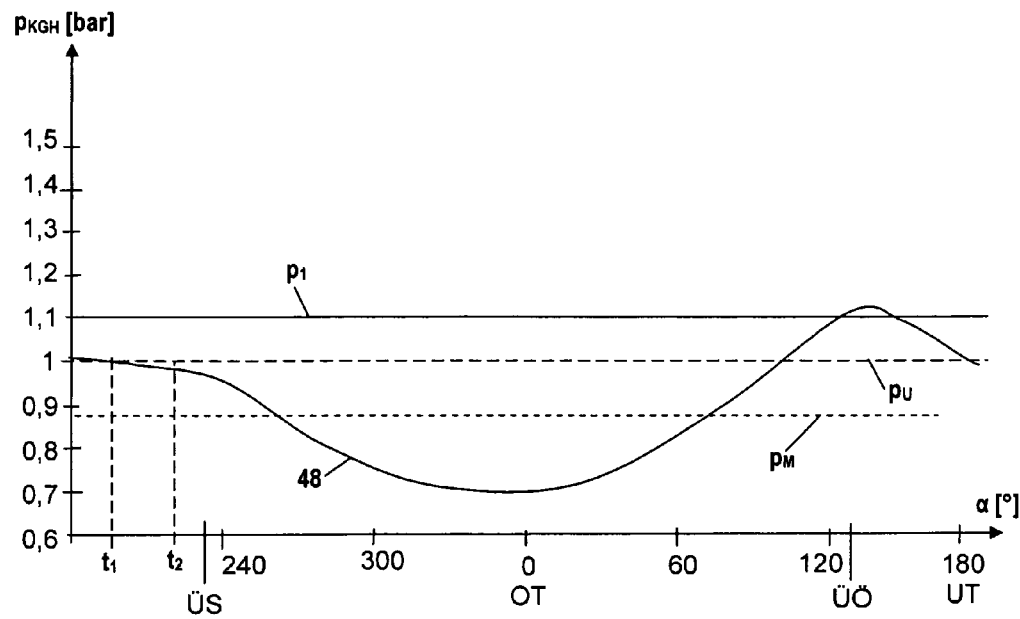
FIG. 9 and FIG. 10 are diagrams of the pressure profile in the crankcasing of the internal combustion engine and of the opening and closing times of the metering valve over one revolution of the crankshaft.

FIG. 9 shows, with a curve 48, the pressure profile in the crankcasing 4 in the idling mode of the internal combustion engine 1. The curve 48 gives the pressure here as an absolute pressure. The ambient pressure $P_u$ is indicated with a dashed line. The resulting crankcasing mean pressure $p_M$ is also given by a dashed line. The crankcasing mean pressure $p_M$ is below the ambient pressure $P_U$. Fuel is fed at a fuel pressure $p_1$ to the metering valve 17. The fuel pressure $p_1$ is advantageously ambient pressure or up to approximately 0.5 bar, in particular approximately 0.05 bar or up to approximately 0.3 bar above the ambient pressure $p_u$. In the exemplary embodiment shown, the pressure $p_1$ of the fuel is approximately 0.1 bar above the ambient pressure $p_u$. The aforesaid pressure ranges for the feeding of fuel into the crankcasing 4 can also be advantageous for the feeding of fuel into the overflow duct 10.

As is shown by FIG. 9, in the idling mode there is provision for the metering valve 17 to open at a time $t_1$ just after the bottom dead center UT of the piston 5 and to close at a time $t_2$ just before the closing of the overflow ducts ÜS. The metering valve 17 accordingly feeds fuel while the overflow ducts 10, 11 are opened to the combustion chamber 3. During this time period, the crankcasing pressure $p_{KGH}$ is approximately constant just after the bottom dead center UT of the piston 5 and is in the region of the ambient pressure $P_U$. The crankcasing pressure $p_{KGH}$ is advantageously between the ambient pressure $P_U$ and approximately 0.3 bar underpressure, in particular between the ambient pressure $P_U$ and approximately 0.1 bar underpressure compared to the ambient pressure $P_U$. Owing to the slight pressure difference between the fuel pressure $p_1$ and the crankcasing pressure $p_{KGH}$, small quantities of fuel can also be metered precisely. Since the crankcasing pressure $p_{KGH}$ is approximately constant, the opening period of the metering valve 17 is approximately proportional to the quantity of fuel which is fed, so that the opening period and therefore the opening time $t_1$ and the closing time $t_2$ can easily be defined. As is shown by FIG. 9, the fuel pressure $p_1$ is lower than the highest crankcasing pressure $p_{KGH}$ in the idling mode.

Figure 10:
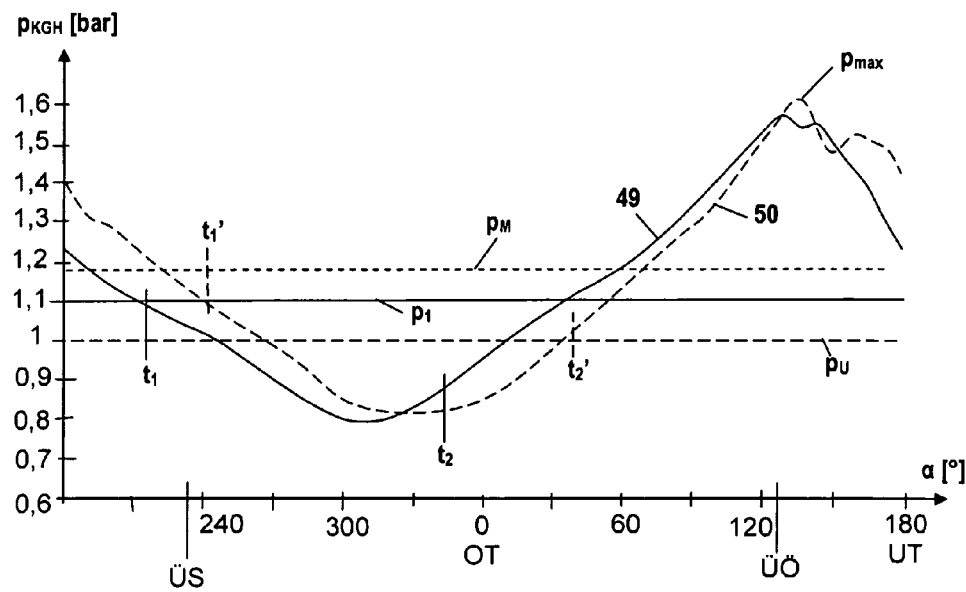

FIG. 10 shows the profile of the crankcasing pressure $p_{KGH}$ in the case of full load. In this context the curve 49 gives the absolute pressure in the crankcasing at a medium rotational speed and the curve 50 gives the absolute pressure in the crankcasing at a high rotational speed. The resulting crankcasing mean pressure $p_M$ is shown by way of example for the pressure profile of the curve 50. The fuel pressure $p_1$ is clearly below the maximum crankcasing pressure $p_{max}$ and also below the crankcasing mean pressure $p_M$. The maximum crankcasing pressure $p_{max}$ occurs here at full load. The fuel pressure $p_1$ is also higher here than the highest crankcasing pressure $p_{KGH}$ which occurs in the idling mode and at partial load or at medium rotational speed.

In the case of the pressure profile which is indicated by the curve 49 there is provision for the metering valve 17 to open at a time $t_1$ which is before the overflow ducts 10, 11 close. The metering valve 17 is closed at a time $t_2$ which is before the top dead center. Both at the time $t_1$ and at the time $t_2$ the crankcasing pressure $p_{KGH}$ is below the fuel pressure $p_1$. This ensures that fuel is sucked into the crankcasing, and combustion air cannot enter the fuel system from the crankcasing 4.

In the case of the pressure profile in the crankcasing at high rotational speeds, indicated by the curve 50, there is provision for the metering valve 17 to open at a time $t_1'$ which is after the overflow ducts ÜS close. At the time $t_1'$, the crankcasing pressure $p_{KGH}$ is slightly below the fuel pressure $p_1$. In the case of the pressure profile shown by the curve 50, the metering valve 17 is closed at a time $t_2'$ which is after the top dead center OT and at which the crankcasing pressure $p_{KGH}$ corresponds approximately to the ambient pressure $P_u$. The times $t_1$, $t_1'$, $t_2$ and $t_2'$ are selected such that the crankcasing pressure $p_{KGH}$ is below the fuel pressure $p_1$. Later values can be selected for the closing times $t_2$ and $t_2'$ here if a relatively large fuel quantity is to be fed. The times $t_2$ and $t_2'$ are advantageously selected here in such a way that the closing times $t_2$ and $t_2'$ occur before the time at which the crankcasing pressure $p_{KGH}$ rises above the fuel pressure $p_1$.

For feeding fuel directly into the crankhousing there is provision for the ratio of the absolute fuel pressure $p_1$ to the absolute crankcasing mean pressure $p_M$ to be approximately 0.0 to approximately 1.7, in particular approximately 0.9 to approximately 1.2. This advantageously applies to all operating states. Since the metering valve 17 is opened only if the crankcasing pressure $p_{KGH}$ is below the fuel pressure $p_1$, a very low value can be selected for the fuel pressure $p_1$. This results in a simple design of the fuel system. The fuel pressure $p_1$ for all the operating states is advantageously below the maximum crankcasing pressure $p_{max}$. In particular for high rotational speeds, and advantageously also for medium rotational speeds there is provision for the fuel pressure $p_1$ to correspond at maximum to the crankcasing mean pressure $p_M$.

An independent inventive idea relates to the fuel quantity which is to be fed to the internal combustion engine 1 per stroke of the piston 5. In the case of full load, the fuel quantity which is to be fed per stroke of the piston is advantageously between 0.0006 g/kW and 0.0015 g/kW. With respect to the cubic capacity of the engine, the fuel quantity which is to be fed is advantageously 0.025 g to 0.06 g per stroke of the piston 5 and per liter of cubic capacity. Quiet running of the internal combustion engine 1 can be achieved with these fed-in fuel quantities. At the same time, the exhaust gas values can be kept low. The fuel quantity which is fed in idling mode is, per engine cycle, advantageously approximately one third to one quarter of the fuel quantity which is fed per engine cycle at the rated rotational speed. The metering valve 17 is embodied in such a way that the aforesaid fuel quantities can be fed at each cycle of the internal combustion engine 1. The fuel quantities which are to be fed are advantageous in particular if the internal combustion engine 1 is embodied as a single-cylinder two-stroke engine. The aforesaid fuel quantities are also advantageous for operating an internal combustion engine in which the opening and closing times of the metering valve are not defined while taking into account the counterpressure at the outlet opening of the metering valve.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A method for operating an internal combustion engine having a cylinder in which a combustion chamber is formed, wherein the combustion chamber is bounded by a piston which is mounted so as to move back and forth in the cylinder, and wherein the piston drives a crankshaft which is rotatably mounted in a crankcasing, having a fuel system which comprises at least one metering valve with an outlet opening for feeding fuel to the internal combustion engine, and with a controller, the method comprising:

feeding fuel at a given pressure to the metering valve wherein the controller determines an amount of fuel to be fed;

setting by the controller the opening time and the closing time of the metering valve based on the amount of fuel to be fed and taking into account the counterpressure prevailing at the outlet opening of the metering valve;

actuating the metering valve in such a way that the metering valve opens and closes at the defined times;

wherein the metering valve is used to feed fuel to the internal combustion engine at an overpressure of less than 2 bar above ambient pressure; and wherein approximately 0.0006 g to approximately 0.0015 g of fuel per kilowatt is fed to the internal combustion engine at full load per stroke of the piston with respect to the power of the internal combustion engine.

2. A method for operating an internal combustion engine having a cylinder in which a combustion chamber is formed, wherein the combustion chamber is bounded by a piston which is mounted so as to move back and forth in the cylinder, and wherein the piston drives a crankshaft which is rotatably mounted in a crankcasing, having a fuel system which comprises at least one metering valve with an outlet opening for feeding fuel to the internal combustion engine, and with a controller, the method comprising:

feeding fuel at a given pressure to the metering valve wherein the controller determines an amount of fuel to be fed;

setting by the controller the opening time and the closing time of the metering valve based on the amount of fuel to be fed and taking into account the counterpressure prevailing at the outlet opening of the metering valve;

actuating the metering valve in such a way that the metering valve opens and closes at the defined times;

wherein the metering valve is used to feed fuel to the internal combustion engine at an overpressure of less than 2 bar above ambient pressure; and wherein approximately 0.025 g to approximately 0.06 g of fuel per engine cycle and per liter of cubic capacity of the engine is fed to the internal combustion engine at full load.

3. The method according to claim 1, wherein approximately a third to a quarter of the fuel quantity which is to be fed to the internal combustion engine per engine cycle at the rated rotational speed is fed to the internal combustion engine per engine cycle in the idling mode.

4. The method according to claim 1, wherein in the fuel is fed at a constant pressure to the metering valve.

5. The method according to claim 1, wherein the metering valve feeds the fuel into a region of the internal combustion engine in which crankcasing pressure prevails.

6. The method according to claim 1, wherein the fuel pressure corresponds at most to the maximum crankcasing pressure.

7. The method according to claim 5, wherein the metering valve feeds the fuel into an overflow duct of the internal combustion engine.

8. The method according to claim 7, wherein the metering valve is fed fuel at a pressure which is ambient pressure or up to approximately 2 bar above the ambient pressure.

9. The method according to claim 8, wherein the fuel pressure is approximately 0.3 bar to approximately 2 bar above the ambient pressure.

10. The method according to claim 7, wherein the ratio of the absolute fuel pressure to the absolute crankcasing mean pressure is approximately 1.3 to approximately 2.8.

11. The method according to claim 10, wherein the ratio of the absolute fuel pressure to the absolute crankcasing mean pressure is approximately 1.7 to approximately 2.2.

12. The method according to claim 7, wherein fuel is fed to the overflow duct while the overflow duct is opened to the combustion chamber.

13. The method according to claim 5, wherein the metering valve feeds the fuel into the crankcasing.

14. The method according to claim 13, wherein the metering valve is fed fuel at a pressure which is ambient pressure or up to approximately 0.5 bar above the ambient pressure.

15. The method according to claim 14, wherein the fuel pressure is approximately 0.05 bar to approximately 0.3 bar above the ambient pressure.

16. The method according to claim 13, wherein the ratio of the absolute fuel pressure to the absolute crankcasing mean pressure is approximately 0.0 to approximately 1.7.

17. The method according to claim 16, wherein the ratio of the absolute fuel pressure to the absolute crankcasing mean pressure is approximately 0.9 to approximately 1.2.

18. The method according to claim 13, wherein the fuel is fed in the idling mode at a time at which a pressure which is between ambient pressure and approximately 0.3 bar underpressure compared to the ambient pressure prevails in the crankcasing.

19. The method according to claim 1, wherein the counterpressure prevailing at the outlet opening is measured by a pressure sensor, and in that the measured counterpressure is taken into account directly.

20. The method according to claim 1, wherein the counterpressure is taken into account by taking into account the load, wherein the crankcasing pressure, the pressure or the position of a throttle element which is arranged in an intake duct of the internal combustion engine is sensed as a load-dependent parameter, wherein the throttle element has a throttle shaft which is connected in a rotationally fixed fashion to the throttle element, and the position of the throttle element is measured by a throttle shaft sensor which senses the rotational position of the throttle shaft.

21. The method according to claim 1, wherein the counterpressure is taken into account by taking into account the rotational speed of the engine, wherein the rotational speed is determined by means of a generator which is arranged on the crankshaft.

22. The method according to claim 1, wherein the controller defines the opening time and the closing time as a function of the fuel quantity which is to be fed, and in that the fuel quantity which is to be fed is determined for each cycle of the internal combustion engine.

23. The method according to claim 1, wherein the opening time and the closing time of the metering valve are determined as a function of the fuel quantity which is to be fed for a reference counterpressure, and at least one of the times is corrected as a function of a parameter which takes into account the counterpressure at the outlet opening, wherein the correction takes place by means of a characteristic diagram or by means of a calculation.

24. The method according to claim 1, wherein the required fuel quantity and at least one parameter which takes into account the counterpressure at the outlet opening are determined, and in that the opening time and the closing time are defined by reference to the fuel quantity and the parameter, wherein the opening time and the closing time are defined or calculated by reference to the fuel quantity and the parameter by means of a characteristic diagram.

* * * * *